(12) United States Patent
Na

(10) Patent No.: US 11,017,294 B2
(45) Date of Patent: May 25, 2021

(54) RECOGNITION METHOD AND APPARATUS

(71) Applicant: SAMSUNG ELECTRONICS CO., LTD., Suwon-si (KR)

(72) Inventor: Hwidong Na, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 1058 days.

(21) Appl. No.: 15/585,377

(22) Filed: May 3, 2017

(65) Prior Publication Data

US 2018/0174044 A1 Jun. 21, 2018

(30) Foreign Application Priority Data

Dec. 16, 2016 (KR) .................. 10-2016-0172391

(51) Int. Cl.
*G06N 3/08* (2006.01)
*G06K 9/66* (2006.01)
*G06K 9/46* (2006.01)
*G06N 3/04* (2006.01)
*G10L 25/30* (2013.01)

(52) U.S. Cl.
CPC ............. *G06N 3/08* (2013.01); *G06K 9/4628* (2013.01); *G06K 9/66* (2013.01); *G06N 3/0445* (2013.01); *G06N 3/0454* (2013.01); *G10L 25/30* (2013.01)

(58) Field of Classification Search
CPC ...... G06N 3/08; G06N 3/0445; G06N 3/0454; G09K 9/4628; G10L 25/30; G06K 9/4628; G06K 9/66
See application file for complete search history.

(56) References Cited

U.S. PATENT DOCUMENTS

| | | | | |
|---|---|---|---|---|
| 8,752,648 | B2* | 6/2014 | Goebel | E21B 44/00 175/40 |
| 8,762,142 | B2* | 6/2014 | Jeong | G10L 15/32 704/202 |
| 8,838,446 | B2* | 9/2014 | Jeong | G10L 15/02 704/202 |
| 9,053,436 | B2* | 6/2015 | Dalessandro | G06N 5/02 |
| 9,111,228 | B2* | 8/2015 | Collica | G06N 7/005 |
| 9,211,078 | B2 | 12/2015 | Meggiolaro et al. | |
| 10,504,023 | B1* | 12/2019 | Bengio | G06N 3/08 |
| 2004/0093315 | A1* | 5/2004 | Carney | G06N 3/0454 706/15 |
| 2007/0011114 | A1* | 1/2007 | Chen | G06N 3/0454 706/15 |

(Continued)

FOREIGN PATENT DOCUMENTS

| | | |
|---|---|---|
| KR | 10-0640264 B1 | 2/2007 |
| KR | 10-2013-0063565 A | 6/2013 |

OTHER PUBLICATIONS

Jun Zheng, "Predicting Software Reliability with Neural Network Ensembles", 2009, pp. 2116-2122 (Year: 2009).*

(Continued)

*Primary Examiner* — Paulinho E Smith
(74) *Attorney, Agent, or Firm* — NSIP Law

(57) ABSTRACT

A method of recognizing input data includes determining a feature vector corresponding to an ensemble model from input data, based on the ensemble model, and recognizing the input data based on the feature vector. The ensemble model includes a first model and a second model having a structure that is the same as a structure of the first model.

20 Claims, 9 Drawing Sheets

(56) References Cited

U.S. PATENT DOCUMENTS

| | | | |
|---|---|---|---|
| 2009/0010495 A1* | 1/2009 | Schamp | B60R 21/0134 382/106 |
| 2012/0109604 A1 | 5/2012 | Chen et al. | |
| 2015/0032680 A1 | 1/2015 | Cichosz et al. | |
| 2015/0100295 A1* | 4/2015 | Jetcheva | G06F 30/367 703/18 |
| 2015/0227741 A1* | 8/2015 | Permeh | G06F 21/52 726/22 |
| 2015/0254568 A1 | 9/2015 | Zhao et al. | |
| 2015/0269495 A1 | 9/2015 | Dalessandro et al. | |
| 2016/0012314 A1* | 1/2016 | Ramamurthy | G06K 9/6244 382/160 |
| 2016/0042292 A1 | 2/2016 | Caplan et al. | |
| 2016/0078339 A1 | 3/2016 | Li et al. | |
| 2017/0132217 A1* | 5/2017 | Na | G06F 40/51 |
| 2017/0270910 A1* | 9/2017 | Jung | G10L 15/063 |
| 2018/0052828 A1* | 2/2018 | Na | G06F 40/58 |
| 2018/0060727 A1* | 3/2018 | Rainwater | G06N 3/0454 |
| 2018/0129937 A1* | 5/2018 | Bradbury | G06N 3/0445 |
| 2018/0174044 A1* | 6/2018 | Na | G06K 9/66 |
| 2019/0051292 A1* | 2/2019 | Na | G06N 3/0481 |
| 2019/0155909 A1* | 5/2019 | Na | G06F 40/58 |
| 2019/0303760 A1* | 10/2019 | Kumar | G06N 3/0454 |
| 2019/0370662 A1* | 12/2019 | Song | G06N 3/088 |
| 2020/0025935 A1* | 1/2020 | Liang | G06K 9/00201 |
| 2020/0034666 A1* | 1/2020 | Yun | G06K 9/6262 |
| 2020/0073948 A1* | 3/2020 | Lee | G06F 40/45 |

OTHER PUBLICATIONS

Jianchang Mao, "A Case Study on Bagging, Boosting, and Basic Ensembles of Neural Networks for OCR", 1998, IEEE, pp. 1828-1833 (Year: 1998).*

Siwek et al., "Ensemble Neural Network Approach for Accurate Load Forecasting in a Power System", 2008, Int. Journal of Applied Mathematical Computation Science, vol. 19 No. 2, pp. 303-315 (Year: 2009).*

* cited by examiner

RECOGNITION METHOD AND APPARATUS

CROSS-REFERENCE TO RELATED APPLICATIONS

This application claims the benefit under 35 USC § 119(a) of Korean Patent Application No. 10-2016-0172391, filed on Dec. 16, 2016, in the Korean Intellectual Property Office, the entire disclosure of which is incorporated herein by reference for all purposes.

BACKGROUND

1. Field

The following description relates to a recognition method and apparatus.

2. Description of Related Art

To solve a complex issue or issue with an unknown solution, research to apply a recognition method of a human to a device is being conducted. One example of example of such research is a neural network obtained by modeling human biological neurons. The neural network employs an algorithm that mimics human learning abilities. The neural network performs mapping between an input pattern and an output pattern through learning. Also, the neural network has a generalization capability to generate a relatively correct output in response to an input pattern that is not used for the learning, based on a learned result.

In addition, the neural network may generate a single output by combining at least two different neural network recognition results. The foregoing scheme is referred to as a "model ensemble."

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a recognition method includes: determining a feature vector corresponding to an ensemble model from input data based on the ensemble model, wherein the ensemble model includes a first model and a second model with a same structure as a structure of the first model; and recognizing the input data based on the feature vector.

The determining of the feature vector may include determining a feature vector output from a second layer using first connection weights between a first layer and the second layer in the ensemble model, and a first feature vector output from the first layer based on the input data.

The determining of the feature vector may further include determining the feature vector based on a portion of a first operation result obtained based on the first connection weights and the first feature vector.

The portion of the first operation result may include: an operation result obtained based on first partial weights corresponding to the first model among the first connection weights, and a first partial vector corresponding to the first model in the first feature vector; and an operation result obtained based on second partial weights corresponding to the second model among the first connection weights, and a second partial vector corresponding to the second model in the first feature vector.

The determining of the feature vector may further include using second connection weights of the second layer between a previous time and a current time, and a second feature vector output from the second layer at the previous time, to determine the feature vector output from the second layer.

The determining of the feature vector may further include determining the feature vector by using a portion of a second operation result obtained based on the second connection weights and the second feature vector.

The portion of the second operation result may include: an operation result obtained based on third partial weights corresponding to the first model among the second connection weights and a third partial vector corresponding to the first model in the second feature vector; and an operation result obtained based on fourth partial weights corresponding to the second model among the second connection weights and a fourth partial vector corresponding to the second model in the second feature vector.

The portion of the second operation result may include a principal diagonal element of a matrix determined as the second operation result.

The first model and the second model may be assigned to a same apparatus.

The first model and the second model may be implemented in parallel.

The first model and the second model may include a same number of layers, a same number of nodes and a same connection relationship between the layers.

The recognizing of the input data may include recognizing the input data based on an n-th element corresponding to the first model and an n-th element corresponding to the second model in the feature vector.

The feature vector may include a first partial feature vector corresponding to the first model and a second partial feature vector corresponding to the second model.

A non-transitory computer-readable storage medium may store instructions that, when executed by a processor, cause the processor to perform the method.

In another general aspect, a recognition apparatus includes: a processor; and a memory including at least one instruction executable by the processor. The processor is configured to, in response to the at least one instruction being executed by the processor, determine a feature vector corresponding to an ensemble model from input data based on the ensemble model, and recognize the input data based on the feature vector. The ensemble model includes a first model and a second model with the same structure as that of the first model.

The processor may be further configured to use first connection weights between a first layer and a second layer in the ensemble model, and a first feature vector output from the first layer based on the input data, to determine a feature vector output from the second layer.

The processor may be further configured to determine the feature vector based on a portion of a first operation result obtained based on the first connection weights and the first feature vector.

The processor may be further configured to use second connection weights of the second layer between a previous time and a current time, and a second feature vector output from the second layer at the previous time, to determine the feature vector output from the second layer.

The processor may be further configured to determine the feature vector by further using a portion of a second operation result obtained based on the second connection weights and the second feature vector.

The portion of the second operation result may include a principal diagonal element of a matrix determined as the second operation result.

In another general aspect, a method to recognize input data includes: receiving the input data in an ensemble neural network including a first neural network and a second neural network implemented in parallel with the first neural network; calculating, by a processor, in a first layer of the first neural network, a first partial feature vector; calculating, by the processor, in a first layer of the second neural network, a second partial feature vector; calculating, by the processor, a feature vector, by applying a weight matrix to the first partial feature vector and the second partial feature vector, wherein the weight matrix includes connection weights between the first layer of the first neural network and a second layer of the first neural network, and connection weights between the first layer of the second neural network and a second layer of the second neural network; and recognizing the input data based on the feature vector.

The applying of the weight matrix to the first partial feature vector and the second partial feature vector may include multiplying a matrix including the first partial feature vector and the second partial feature vector by the weight matrix.

The calculating of the feature vector may further include applying an activation function to a result of the multiplying of the matrix including the first partial feature vector and the second partial feature vector by the weight matrix.

The activation function may include a term based on a third partial feature vector output from the second layer of the first neural network at a previous time, and a fourth partial feature vector output from the second layer of the second neural network at a previous time.

The input data may include one of an image, an audio signal and a text.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
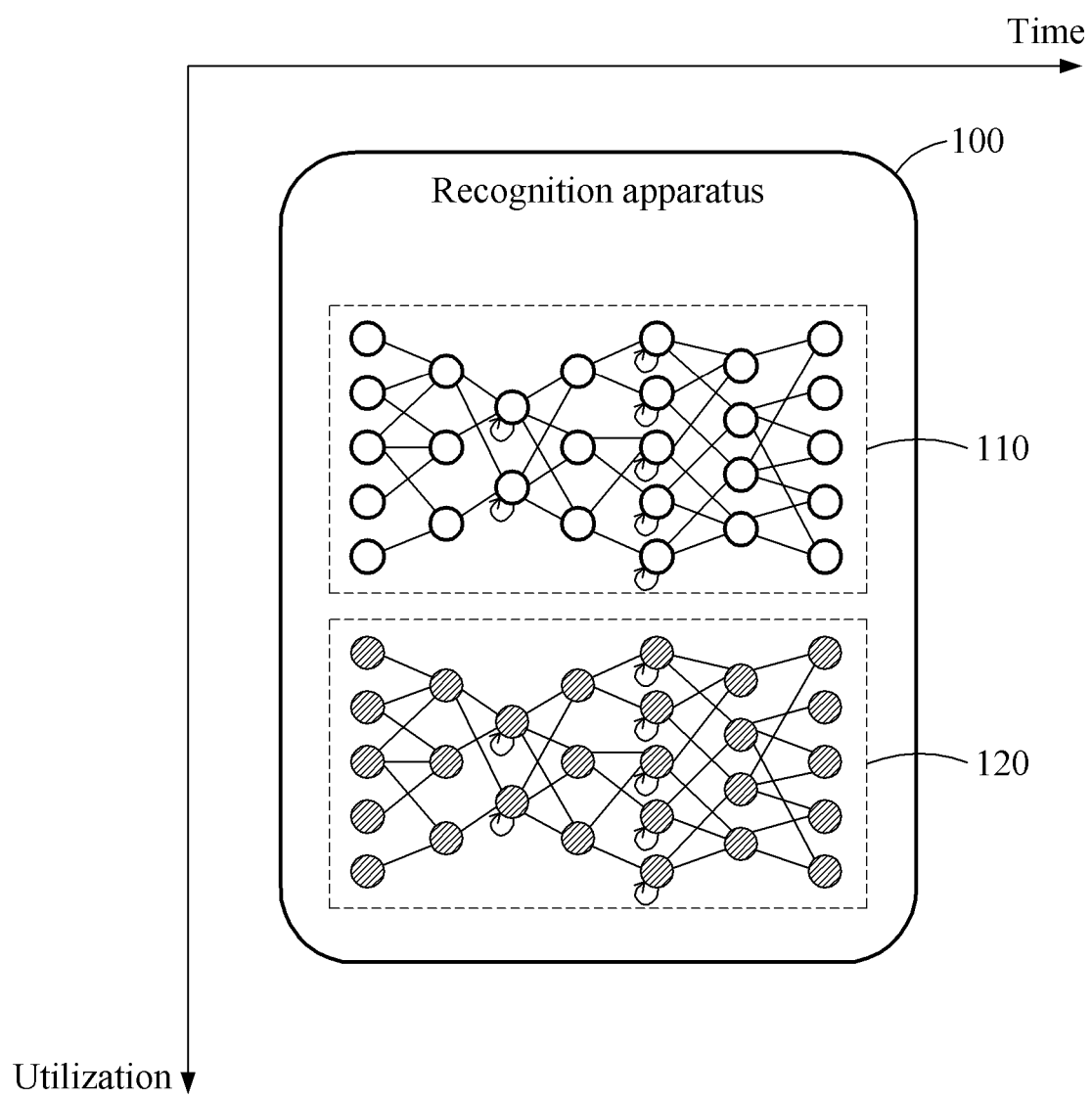
FIG. 1 illustrates an example of a recognition apparatus to which an ensemble model is assigned.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The following specific structural or functional descriptions merely describe examples, and the scope of the examples is not limited to the descriptions provided herein. Various changes and modifications can be made to the disclosed examples by those of ordinary skill in the art.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

It will be understood that when a component is referred to as being "connected to" another component, the component can be directly connected or coupled to the other component or intervening components may be present.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined herein, all terms used herein including technical or scientific terms have the same meanings as those generally understood by one of ordinary skill in the art. Terms defined in dictionaries generally used should be construed to have meanings matching with contextual meanings in the related art and are not to be construed as an ideal or excessively formal meaning unless otherwise defined herein.

The features of the examples described herein may be combined in various ways as will be apparent after an understanding of the disclosure of this application. Further, although the examples described herein have a variety of configurations, other configurations are possible as will be apparent after an understanding of the disclosure of this application.

In the following description, examples may be used to recognize input data using a model. Also, examples may be used to learn a model for recognizing input data. Examples may be implemented as various types of products, for example, personal computers (PC), laptop computers, tablet computers, smartphones, wearable devices, smart home appliances intelligent vehicles, or kiosks. For example, examples may be applicable to recognize input data using a model in a smartphone, a mobile device or a wearable device. Hereinafter, examples will be described in detail with reference to the accompanying drawings, and like reference numerals in the drawings refer to like elements throughout.

FIG. 1 illustrates an example of a recognition apparatus 100 to which an ensemble model is assigned. Referring to FIG. 1, the ensemble model includes a first model 110 and a second model 120.

The recognition apparatus 100 determines a feature vector that corresponds to the first model 110 and the second model 120 from input data using the first model 110 and the second model 120, and recognizes the input data based on the determined feature vector. For example, the recognition apparatus 100 classifies, detects and/or segments objects included in the input data, recognizes user's voice included in the input data, or translates text included in the input data. The input data is data that the recognition apparatus 100 is to recognize, and includes, for example, an image, a moving image, an audio signal or text.

The first model 110 and the second model 120 are neural networks assigned to the recognition apparatus 100. A neural network is used for deep learning. Deep learning is a machine learning scheme for recognizing an image or voice from a big data set. The neural network includes, for example, a multilayer neural network including layers. The multilayer neural network includes, for example, a fully connected neural network, a recurrent neural network (RNN), a long short-term memory (LSTM), a gated recurrent unit (GRU) or a bidirectional RNN.

For example, the first model 110 and the second model 120 are neural networks with the same structure. For example, the first model 110 and the second model 120 have the same number of layers, the same number of nodes, and the same connection relationship between layers. Also, the first model 110 and the second model 120 are assigned in parallel to the same apparatus, for example, the recognition apparatus 100.

The first model 110 and the second model 120 are distinct from each other. Layers included in the first model 110 are not connected to layers included in the second model 120. Also, a feature vector output from a layer in the first model 110 is not transmitted to the second model 120, and a feature vector output from a layer in the second model 120 is not transmitted to the first model 120. Input data is input to each of the first model 110 and the second model 120, and a recognition result of the input data is determined in each of the first model 110 and the second model 120. However, the recognition apparatus 100 combines recognition results determined in the first model 110 and the second model 120 to output a single recognition result. The first model 110 and the second model 120 form the ensemble model.

The first model 110 and the second model 120 have different prediction capabilities and are combined into the ensemble model, and accordingly the recognition apparatus 100 outputs a recognition result that complements all prediction results of individual models.

Although FIG. 1 and the associated description describe two models (the first model 110 and the second model 120) that form the ensemble model, this is merely an example. For example, more than two models may form an ensemble model.

As described above, the ensemble model including the first model 110 and the second model 120 that have the same structure is assigned to the recognition apparatus 100, and thus it is possible to maximize a utilization of the recognition apparatus 100. The utilization is measured based on, for example, floating-point operations per second or a memory capacity used for an operation of the recognition apparatus 100.

Hereinafter, examples of processes of determining a feature vector in the ensemble model including the first model 110 and the second model 120 are described.

FIGS. 2 through 5 illustrate an example of a process of determining a feature vector corresponding to an ensemble model.

Figure 2:
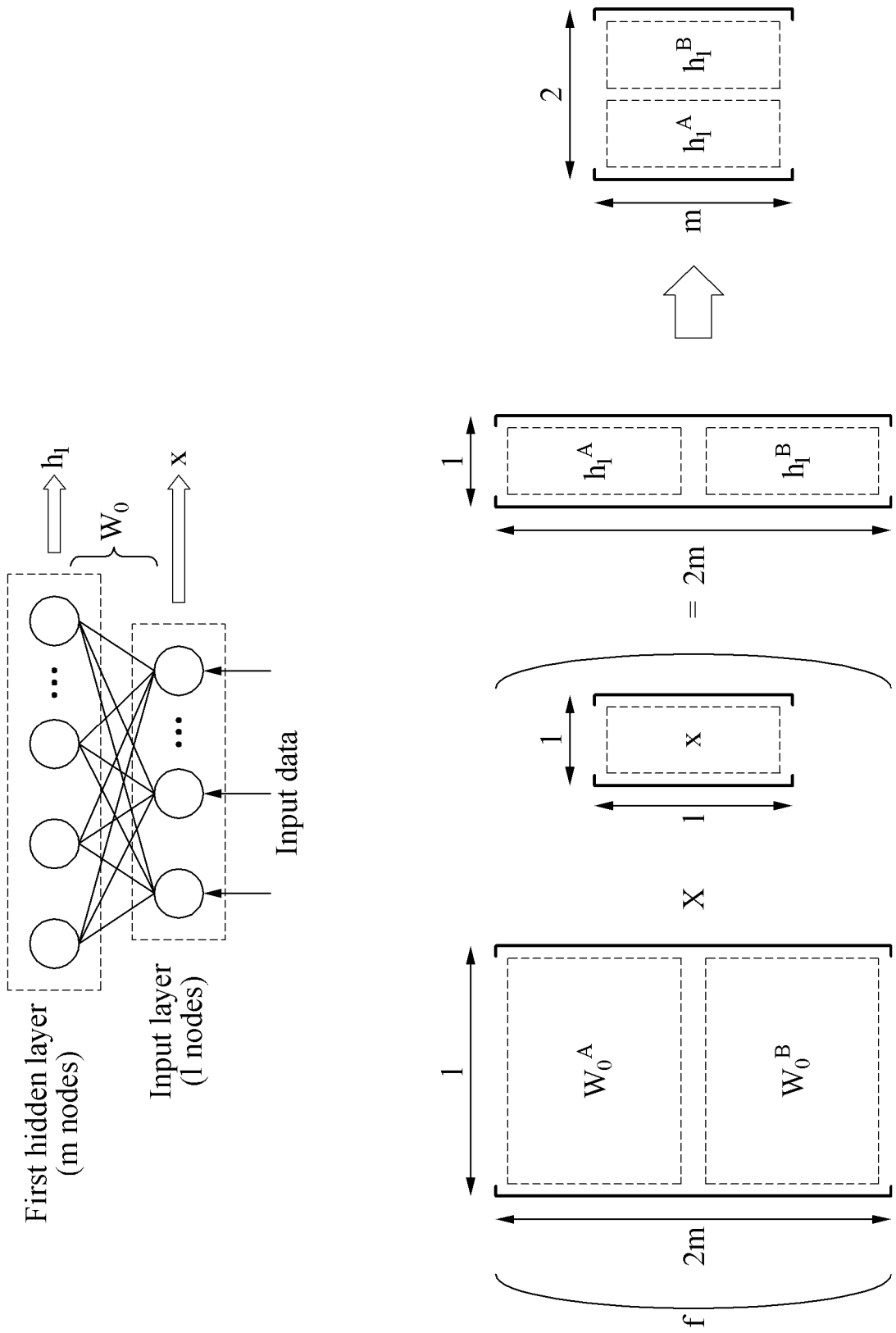
FIGS. 2 through 5 illustrate an example of a process of determining a feature vector corresponding to an ensemble model.

FIG. 2 illustrates an example of a process of determining a feature vector $h_1$ corresponding to an ensemble model in a first hidden layer connected to an input layer. Referring to FIG. 2, the input layer is a first layer included in the ensemble model, and receives input data. The input data is represented by an input vector x in the input layer. The feature vector $h_1$ is determined in the first hidden layer based on the input vector x and connection weights between the input layer and the first hidden layer.

Figure 3:
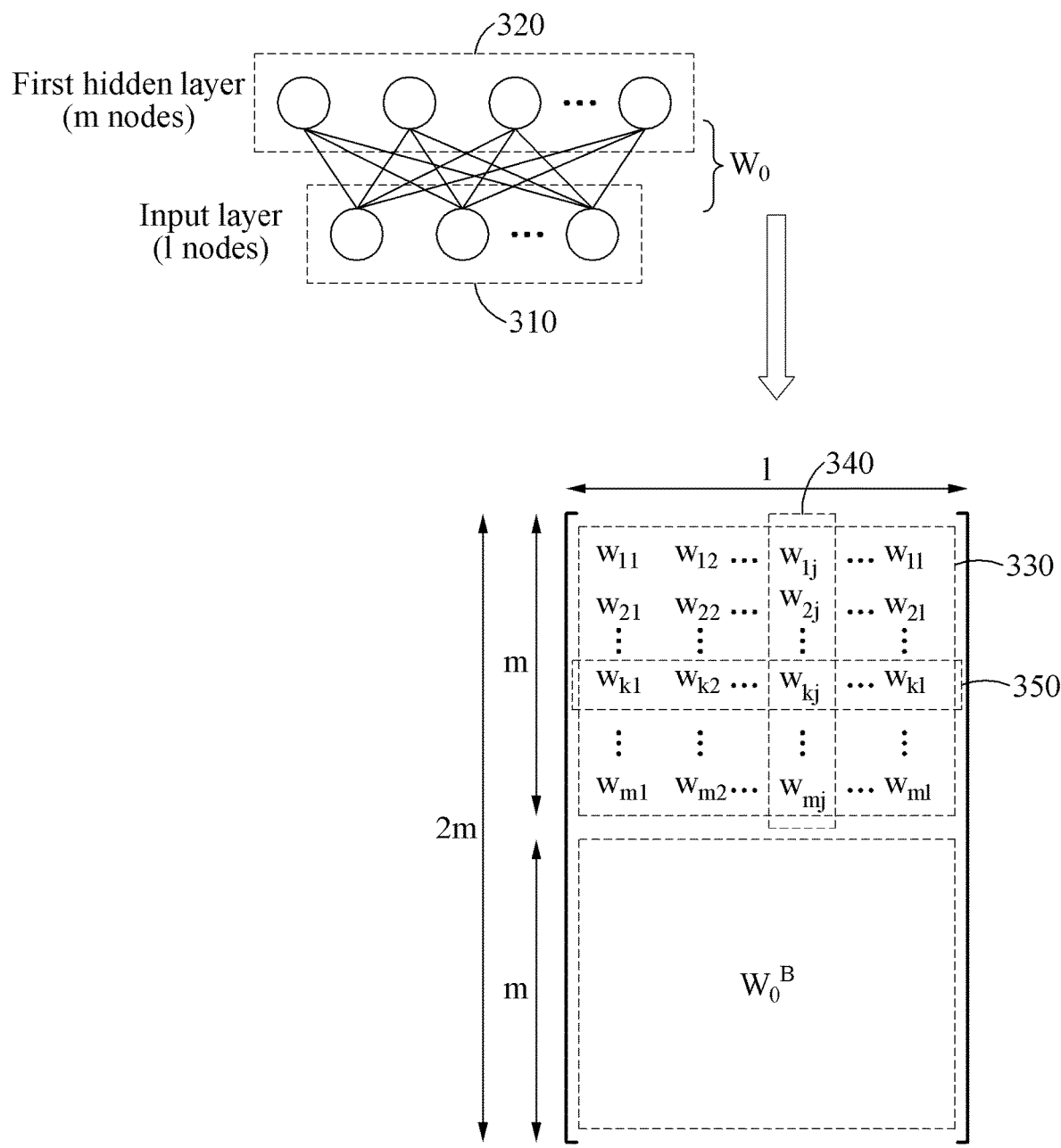

The connection weights between the input layer and the first hidden layer are represented by a weight matrix $W_0$, and include first partial weights corresponding to a first model and second partial weights corresponding to a second model. The weight matrix $W_0$ includes a submatrix $W_0^A$ corresponding to the first model and a submatrix $W_0^B$ corresponding to the second model. FIG. 3 illustrates an example of the weight matrix $W_0$. In FIG. 3, an input layer 310 includes "l" nodes, and a first hidden layer 320 includes "m" nodes. In this example, because a first model and a second model have the same structure, submatrices $W_0^A$ 330 and $W_0^B$ each have a size of "m×l" and the weight matrix $W_0$ has a size of "2m×l."

A j-th column 340 included in the submatrix $W_0^A$ 330 represents weights connected from a j-th node in the input layer 310 to nodes in the first hidden layer 320 in the first model. A k-th row 350 included in the submatrix $W_0^A$ 330 represents weights connected from nodes in the input layer 310 to a k-th node in the first hidden layer 320 in the first model. For example, a matrix element $w_{kj}$ included in the submatrix $W_0^A$ 330 represents a weight connected from the j-th node in the input layer 310 to the k-th node in the first hidden layer 320 in the first model.

The submatrix $W_0^B$ corresponds to the second model. The description of the submatrix $W_0^A$ 330 corresponding to the first model is also applicable to the submatrix $W_0^B$, and accordingly further description of the submatrix $W_0^B$ is omitted here.

The process of determining the feature vector $h_1$ in the first hidden layer is further described with reference to FIG. 2.

Referring back to FIG. 2, because the input data is equally input to the first model and the second model, the feature vector $h_1$ is calculated by applying an activation function f to a product of the weight matrix $W_0$ and the input vector x. The feature vector $h_1$ has a size of "2m×l," and includes a partial feature vector $h_1^A$ corresponding to the first model and a partial feature vector $h_1^B$ corresponding to the second model. In the feature vector $h_1$, a first row to an m-th row represent the partial feature vector $h_1^A$, and an (m+1)-th row to a 2m-th row represent the partial feature vector $h_1^B$.

The partial feature vector $h_1^A$ is a feature vector determined in a first hidden layer in response to an input of the input vector x to an input layer in the first model. Also, the partial feature vector $h_1^B$ is a feature vector determined in a first hidden layer in response to an input of the input vector x to an input layer in the second model.

Figure 4:
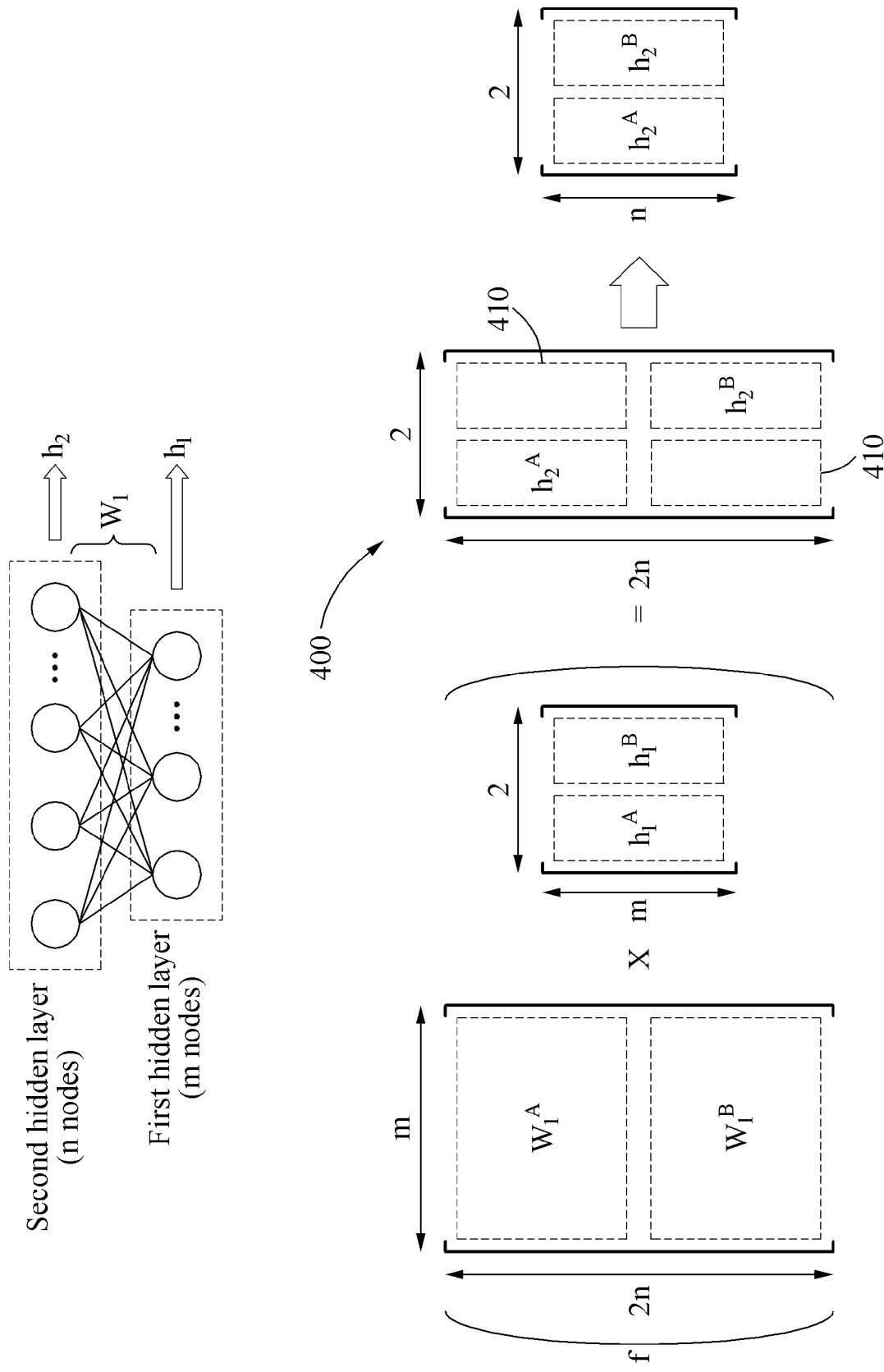

The feature vector $h_1$ is used to determine a feature vector $h_2$ in a second hidden layer. As shown in FIG. 4, the feature vector $h_1$ is transformed to an "m×2" matrix and the "m×2" matrix is used to determine the feature vector $h_2$. The "m×2" matrix used to determine the feature vector $h_2$ includes the partial feature vector $h_1^A$ as a first column and the partial feature vector $h_1^B$ as a second column, as illustrated in FIG. 4.

An example of a process of determining the feature vector $h_2$ is further described with reference to FIG. 4. More specifically, FIG. 4 illustrates an example of a process of determining the feature vector $h_2$ corresponding to an ensemble model in a second hidden layer.

In FIG. 4, a weight matrix $W_1$ represents connection weights between a first hidden layer and the second hidden layer in the ensemble model. The weight matrix $W_1$ includes submatrices $W_1^A$ and $W_1^B$. The submatrix $W_1^A$ represents connection weights between a first hidden layer and a second hidden layer in a first model. The submatrix $W_1^B$ represents connection weights between a first hidden layer and a second hidden layer in a second model.

In FIG. 4, the first hidden layer includes "m" nodes and the second hidden layer includes "n" nodes. Because the first model and the second model have the same structure, the submatrices $W_1^A$ and $W_1^B$ each have a size of "n×m" and the weight matrix $W_1$ has a size of "2n×m."

In the second hidden layer, the feature vector $h_2$ is determined based on the weight matrix $W_1$ and the feature vector $h_1$. The feature vector $h_1$ is transformed to an "m×2" matrix as described above with reference to FIG. 2, and the "m×2" matrix is multiplied by the weight matrix $W_1$. An activation function f is applied to a result of multiplication of the "m×2" matrix and the weight matrix $W_1$, to determine an operation result 400.

Still referring to FIG. 4, the operation result 400 is a "2n×2" matrix, and the feature vector $h_2$ is determined based on a portion of the operation result 400. In the operation result 400, a first row to an n-th row in a first column represent a partial feature vector $h_2^A$ corresponding to the first model, and an (n+1)-th row to a 2n-th row in a second column represent a partial feature vector $h_2^B$ corresponding to the second model. Accordingly, the partial feature vectors $h_2^A$ and $h_2^B$ are extracted from the operation result 400, and the feature vector $h_2$ is determined. The other portions 410 in the operation result 400 are excluded.

The partial feature vector $h_2^A$ is a feature vector determined in the second hidden layer in the first model. The partial feature vector $h_2^B$ is a feature vector determined in the second hidden layer in the second model.

The feature vector $h_2$ is used to determine a feature vector $h_3$ in a third hidden layer. The feature vector $h_2$ is transformed to an "n×2" matrix and the matrix is used to determine the feature vector $h_3$. The "n×2" matrix used to determine the feature vector $h_3$ includes the partial feature vector $h_2^A$ as a first column and the partial feature vector $h_2^B$ as a second column.

Figure 5:
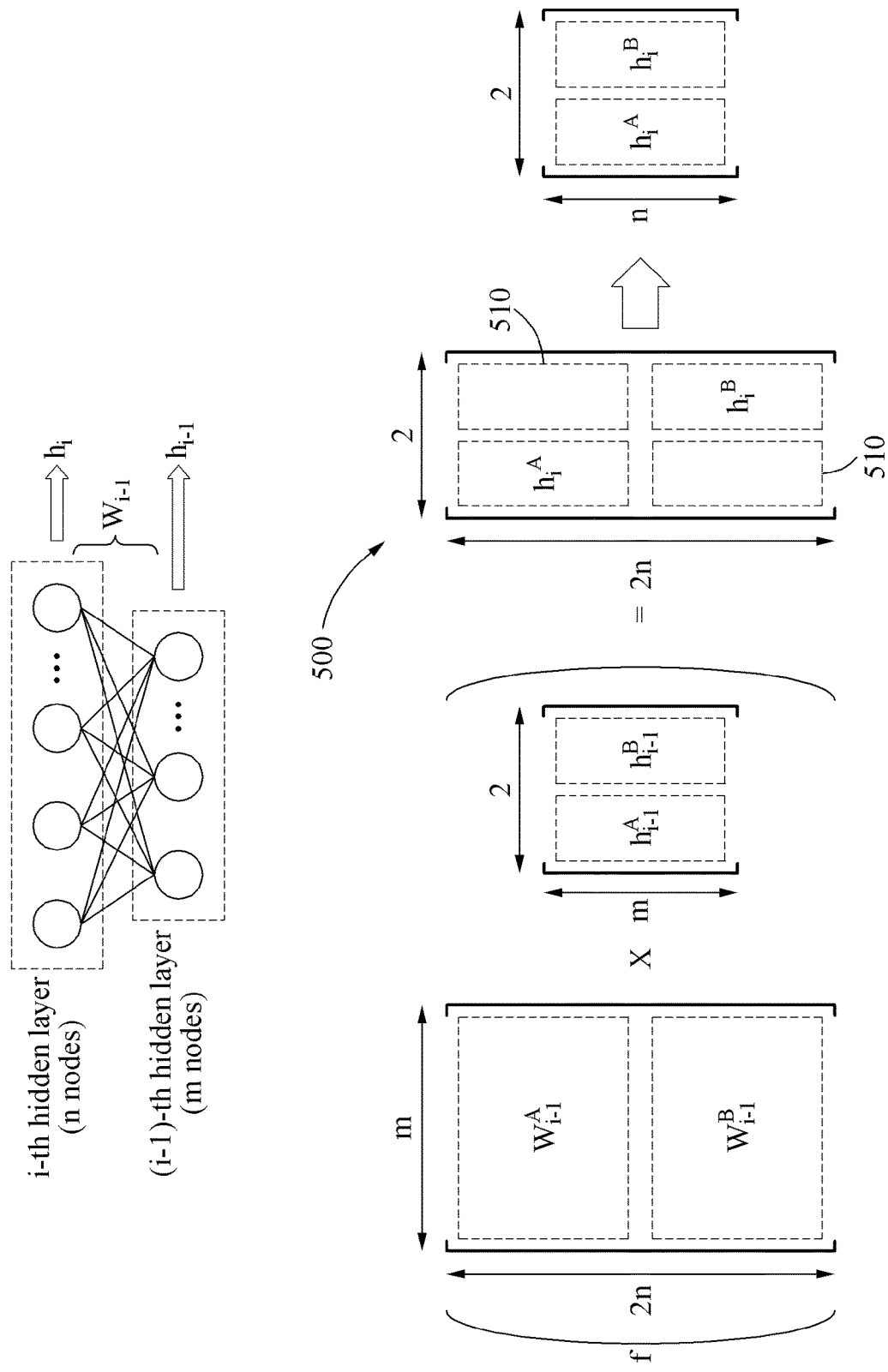

FIG. 5 illustrates an example of a process of determining a feature vector $h_i$ corresponding to an ensemble model in a hidden layer.

The process of FIG. 5 is obtained by generalizing the processes described above in FIGS. 2 through 4. In FIG. 5, the feature vector $h_i$ is determined in an i-th hidden layer when an (i−1)-th hidden layer includes "m" nodes and the i-th hidden layer includes "n" nodes.

An activation function f is applied to a result of multiplication of a weight matrix $W_{i-1}$ and a matrix obtained by transforming a feature vector $h_{i-1}$ determined in the (i−1)-th hidden layer, to determine an operation result 500. The feature vector $h_i$ is determined based on a portion of the operation result 500. The feature vector $h_i$ is transformed to an "n×2" matrix and the "n×2" matrix is used to determine a feature vector $h_{i+1}$ in an (i+1)-th hidden layer. The other portions 510 in the operation result 500 are excluded.

Figure 6:
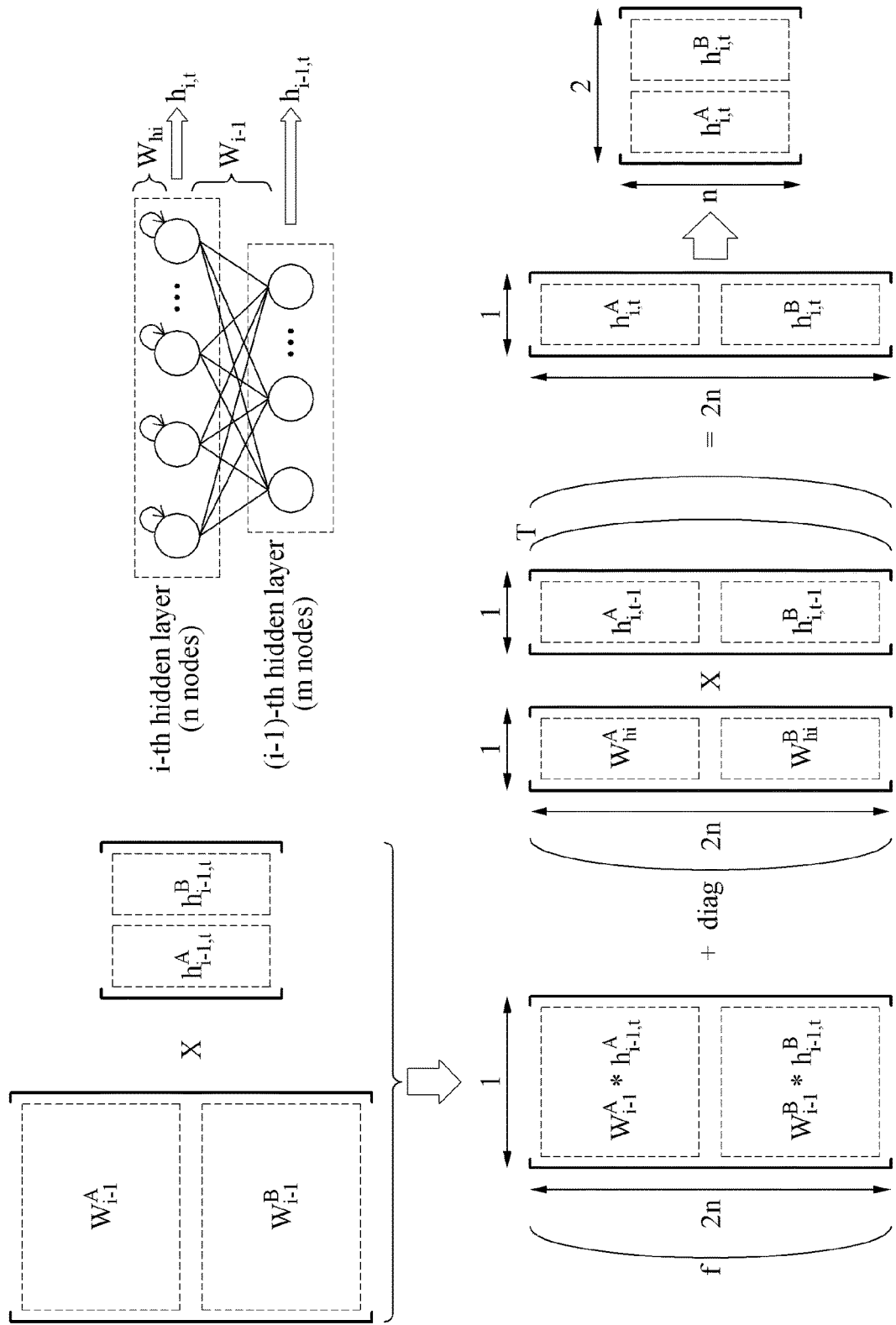
FIGS. 6 and 7 illustrate another example of a process of determining a feature vector corresponding to an ensemble model.
Figure 7:
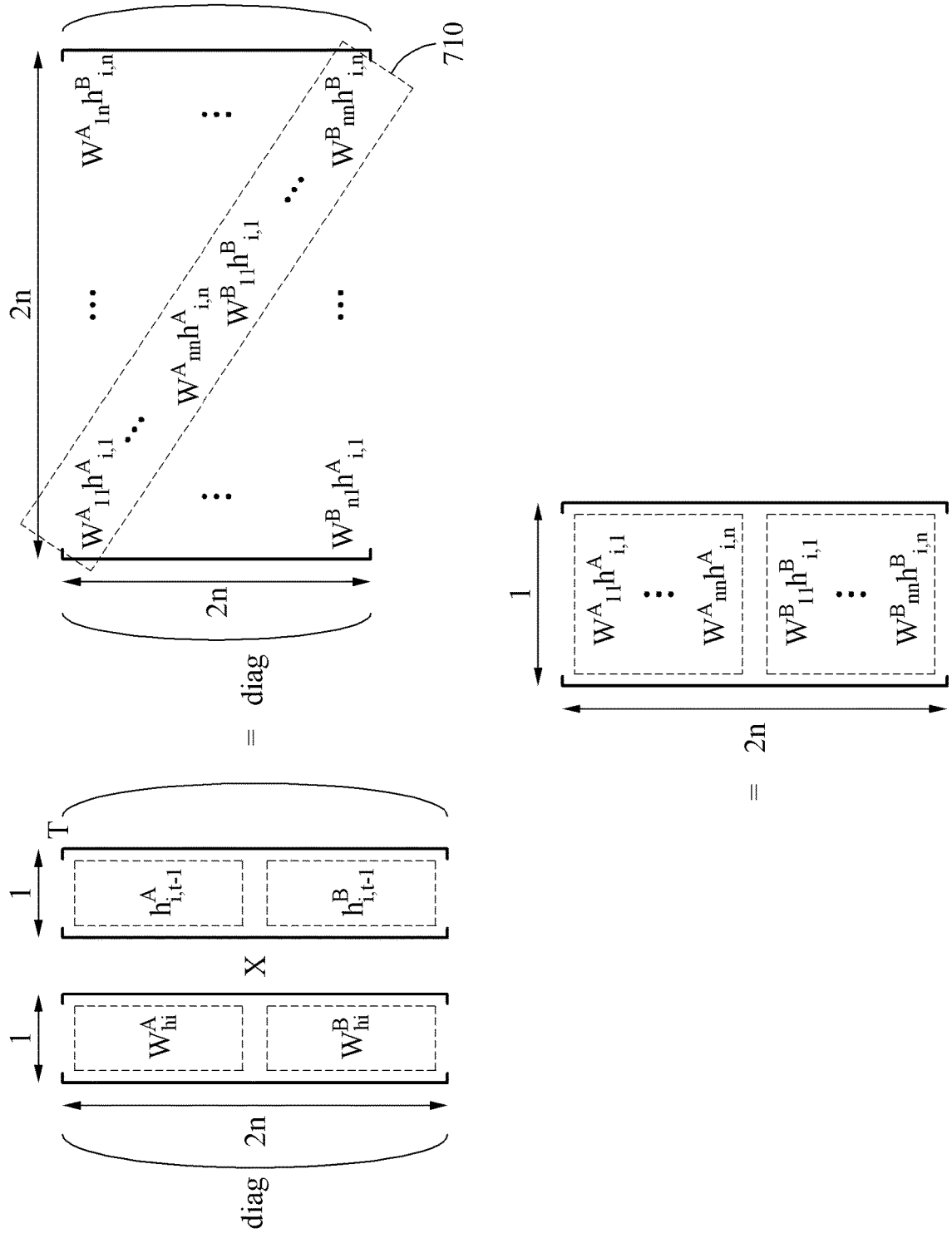

FIGS. 6 and 7 illustrate another example of a process of determining a feature vector corresponding to an ensemble model.

FIG. 6 illustrates an example of a process of determining a feature vector $h_{i,t}$ corresponding to an ensemble model when a first model and a second model included in the ensemble model are RNNs. An RNN is a neural network including a loop, and has a structure in which an output of a layer in the RNN inputs to the layer again. For example, an output from a node in an RNN at a previous time recurs and is input to the node again. Accordingly, when a first model and a second model in an ensemble model are RNNs, a feature vector needs to be determined based on a feature vector output at a previous time as well as a feature vector output from a previous layer.

Unlike the above description, an activation function f of FIG. 6 includes two terms, for example, a first term and a second term. The first term is based on a feature vector output from a previous layer, for example, an (i−1)-th hidden layer. The above description of FIG. 5 is equally applicable to the first term. The first term is determined based on a portion of a result of multiplication of a weight matrix $W_{i-1}$ and a matrix obtained by transforming a feature vector $h_{i-1,t}$ output from the previous layer. The weight matrix $W_{i-1}$ represents connection weights between the previous layer and a current layer, for example, an i-th hidden layer.

The second term is based on a feature vector output from the current layer at a previous time, and is further described below with reference to FIG. 7.

FIG. 7 illustrates an example of a process of determining the second term of FIG. 6 based on a feature vector $h_{i,t-1}$ output from a current layer at a previous time in an RNN.

In FIG. 7, connection weights of the current layer between a previous time and a current time are represented by a weight matrix $W_{hi}$. The weight matrix $W_{hi}$ has a size of "2n×1" and includes a submatrix $W_{hi}^A$ corresponding to a first model and a submatrix $W_{hi}^B$ corresponding to a second model. In the weight matrix $W_{hi}$, a first row to an n-th row represent the submatrix $W_{hi}^A$, and an (n+1)-th row to a 2n-th row represent the submatrix $W_{hi}^B$.

A matrix element $w_{kk}$ included in the submatrix $W_{hi}^A$ represents a recurrent weight of a k-th node in an i-th layer in the first model. Similarly, a matrix element $w_{kk}$ included in the submatrix $W_{hi}^B$ represents a recurrent weight of a k-th node in an i-th layer in the second model.

The feature vector $h_{i,t-1}$ output from the current layer at the previous time includes a partial feature vector $h_{i,t-1}^A$ corresponding to the first model and a partial feature vector $h_{i,t-1}^B$ responding to the second model. The partial feature vector $h_{i,t-1}^A$ is a feature vector output from an i-th hidden layer in the first model at the previous time, and the partial feature vector $h_{i,t-1}^B$ is a feature vector output from an i-th hidden layer in the second model at the previous time.

A transpose of the feature vector $h_{i,t-1}$ is multiplied by the weight matrix $W_{hi}$. A "2n×2n" matrix is determined as a result of multiplication, and a principal diagonal element 710 of the "2n×2n" matrix is extracted based on diag( ), and accordingly the second term of FIG. 6 is determined. For example, a portion of the result of multiplication is extracted to determine the second term.

The second term has a size of "2n×1." In the second term, a first row to an n-th row represent a result obtained by applying a recurrent weight to a feature vector output from the i-th hidden layer in the first model at the previous time. An (n+1)-th row to a 2n-th row represent a result obtained by applying a recurrent weight to a feature vector output from the i-th hidden layer in the second model at the previous time.

The process of determining the feature vector $h_{i,t}$ in the i-th hidden layer is further described below with reference to FIG. 6.

The activation function f is applied to a result obtained by adding the first term and the second term of FIG. 6, and accordingly the feature vector $h_{i,t}$ is determined in the i-th hidden layer.

The feature vector $h_{i,t}$ has a size of "2n×1." In the feature vector $h_{i,t}$, a first row to an n-th row represent a partial feature vector $h_{i,t}^A$ determined in the i-th hidden layer in the first model, and an (n+1)-th row to a 2n-th row represent a partial feature vector $h_{i,t}^B$ determined in the i-th hidden layer in the second model.

The feature vector $h_{i,t}$ is transformed to an "n×2" matrix and the "n×2" matrix is used to determine a feature vector in a next layer (for example, an (i+1)-th hidden layer).

Figure 8:
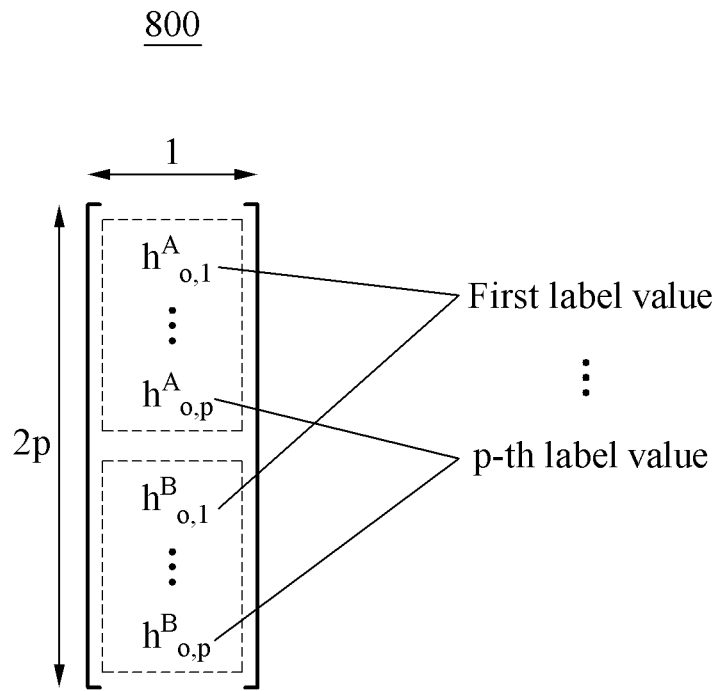
FIG. 8 illustrates an example of a process of determining a label value in an output layer.

FIG. 8 illustrates an example of a process of determining a label value in an output layer.

Referring to FIG. 8, a label value is determined in an output layer. When the output layer includes "p" nodes, "p" label values in total are determined based on a feature vector $h_o$ 800 determined in the output layer.

The feature vector $h_o$ 800 is determined based on the above-described processes. The feature vector $h_o$ 800 has a size of "2p×1," and includes a partial feature vector $h_o^A$ corresponding to a first model and a partial feature vector $h_o^B$ corresponding to a second model.

A k-th label value of an ensemble model is determined based on a k-th element $h_{o,k}^A$ included in the partial feature vector $h_o^A$ and k-th element $h_{o,k}^B$ included in the partial feature vector $h_o^B$. For example, a softmax function is applied to each of the k-th elements $h_{o,k}^A$ and $h_{o,k}^B$ and the k-th label value is determined based on an average value, a maximum value or a minimum value of results obtained by applying the softmax function. Accordingly, the k-th label value is determined based on an output value of a k-th node in an output layer in the first model and an output value of a k-th node in an output layer in the second model.

Figure 9:
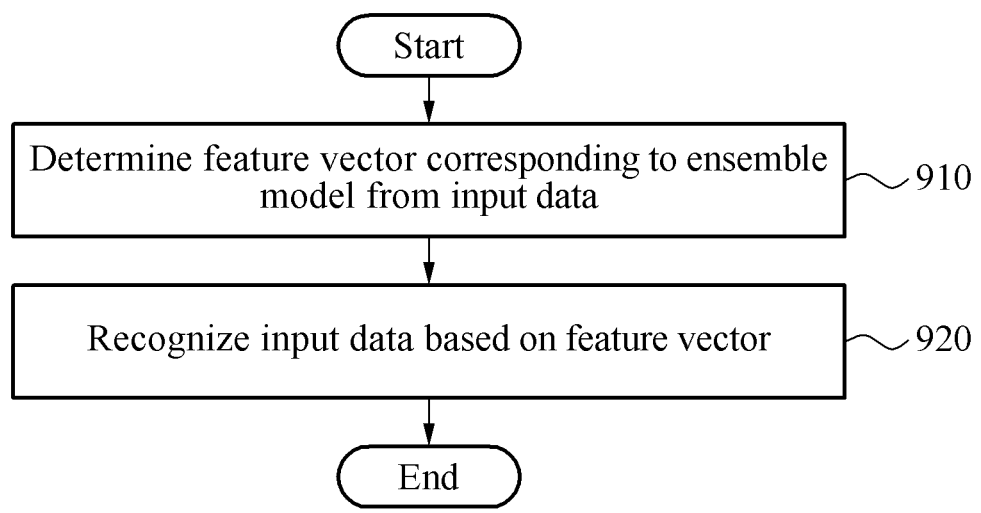
FIG. 9 illustrates an example of a recognition method.

FIG. 9 illustrates an example of a recognition method. The recognition method of FIG. 9 is performed by a processor included in a recognition apparatus.

Referring to FIG. 9, in operation 910, the recognition apparatus determines a feature vector corresponding to an ensemble model from input data based on the ensemble model. The ensemble model includes a first model and a second model that have the same structure.

For example, the recognition apparatus uses first connection weights between a first layer and a second layer in the ensemble model, and a first feature vector output from the first layer based on the input data, to determine a feature vector output from the second layer. The first layer is a previous layer of the second layer. The recognition apparatus determines the feature vector based on a portion of a first operation result obtained based on the first connection weights and the first feature vector. The portion of the first operation result includes an operation result obtained based on first partial weights corresponding to the first model among the first connection weights and a first partial vector corresponding to the first model in the first feature vector, and an operation result obtained based on second partial weights corresponding to the second model among the first connection weights and a second partial vector corresponding to the second model in the first feature vector.

The recognition apparatus further uses second connection weights of the second layer between a previous time and a current time, and a second feature vector output from the second layer at the previous time, to determine the feature vector output from the second layer. The recognition apparatus determines the feature vector by further using a portion of a second operation result obtained based on the second connection weights and the second feature vector. The portion of the second operation result includes an operation result obtained based on third partial weights corresponding to the first model among the second connection weights and a third partial vector corresponding to the first model in the second feature vector, and an operation result obtained based on fourth partial weights corresponding to the second model among the second connection weights and a fourth partial vector corresponding to the second model in the second feature vector. For example, the portion of the second operation result includes a principal diagonal element of a matrix determined as the second operation result.

In operation 920, the recognition apparatus recognizes the input data based on the feature vector. The recognition apparatus recognizes the input data based on an n-th element corresponding to the first model and an n-th element corresponding to the second model in the feature vector.

The first model and the second model in the ensemble model are assigned to the same apparatus. The first model and the second model are implemented in parallel in the ensemble model. The first model and the second model have the same number of layers, the same number of nodes and the same connection relationship between layers.

In an example, a first model and a second model in an ensemble model are models learned in advance using a general method. The first model and the second model have the same internal structure, however, have different internal parameters (for example, connection weights) due to random initialization. In another example, a first model and a second model are learned in a state in which an ensemble model is formed with the first model and the second model by the above-described method.

As described above, the first model and the second model in the ensemble model are RNNs, however, the RNNs are merely an example. Accordingly, the above description is also applicable to an LSTM, a GRU and a bidirectional RNN that correspond to a transformation of the RNN. Also, the above description is modified and applicable based on characteristics of the LSTM, the GRU and the bidirectional RNN.

The description of FIGS. 1 through 8 is also applicable to the recognition method of FIG. 9, and accordingly is not repeated here.

Figure 10:
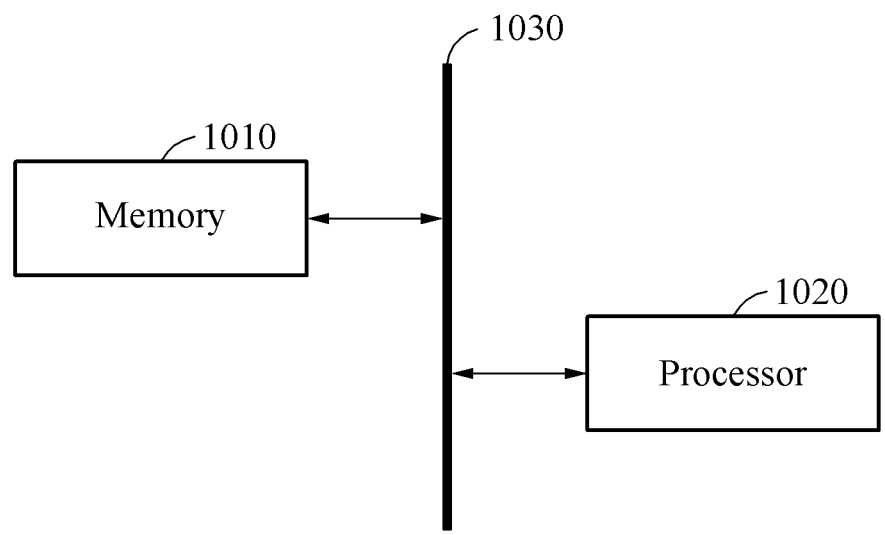
FIG. 10 illustrates an example of a recognition apparatus.

FIG. 10 illustrates an example of a recognition apparatus 1000.

Referring to FIG. 10, the recognition apparatus 1000 includes a memory 1010 and a processor 1020. The memory 1010 and the processor 1020 communicate with each other via a bus 1030.

The memory 1010 stores cluster information and/or parameters of the ensemble model including the first model and the second model that are described above. Also, the memory 1010 stores a computer-readable instruction. When the instruction stored in the memory 1010 is executed by the processor 1020, the processor 1020 performs the above-described operations. The memory 1010 includes, for example, a volatile memory or a nonvolatile memory.

The processor 1020 is an apparatus configured to execute instructions or programs or to control the recognition apparatus 1000, and includes, for example, a central processing unit (CPU) and a graphics processing unit (GPU). The recognition apparatus 1000 is connected to an external device (for example, a PC or a network) via an input/output device (not shown) and exchanges data with the external device. For example, the recognition apparatus 1000 receives an input image using a camera or receives an audio signal using a microphone. The recognition apparatus 1000 is implemented as at least a portion of, for example, a mobile device such as a mobile phone, a smartphone, a personal digital assistant (PDA), a tablet computer or a laptop computer, a computing device such as a PC or a netbook, or an electronic product such as a smart television (TV) or a security device for gate control. The above description is also applicable to the recognition apparatus 1000, and accordingly is not repeated here.

The processor 1020 determines a feature vector corresponding to an ensemble model from input data based on the ensemble model. The ensemble model includes a first model and a second model that have the same structure. Also, the processor 1020 recognizes the input data based on the feature vector.

The description of FIGS. 1 through 9 is also applicable to the recognition apparatus 1000 of FIG. 10, and accordingly is not repeated here.

According to examples, an ensemble model is formed with a first model and a second model that have the same structure, and thus it is possible to simultaneously determine a feature vector of the first model and a feature vector of the second model through a single operation. Also, it is possible to maximize a utilization of a recognition apparatus.

In addition, according to examples, a first model and a second model are arranged in parallel, and thus the same number of apparatuses as a number of models are not used and results output from different apparatuses do not need to be synchronized. Also, at least two models are sequentially assigned to a single apparatus, and thus there is no need to perform a context switch between the models.

Furthermore, according to examples, a plurality of models having the same structure are combined in parallel into an ensemble model, and, accordingly, the same number of additional operations as a square of a number of the models included in the ensemble model are performed to determine a feature vector. Thus, it is possible to maximize a utilization of a recognition apparatus.

The first model 110 and the second model 120 in FIG. 1, and the memory 1010 and the processor 1020 in FIG. 10 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 2 through 9 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A recognition method comprising:
   determining a feature vector corresponding to an ensemble model from input data, based on the ensemble model; and
   recognizing the input data based on the feature vector,
   wherein the ensemble model comprises a first model and a second model with a structure that is the same as a structure of the first model,
   wherein same input data among the input data is input to the first model and the second model,
   wherein the determining of the feature vector comprises determining a feature vector output from a second layer based on a portion of a first operation result obtained based on first connection weights between a first layer and the second layer in the ensemble model, and a first feature vector output from the first layer based on the input data, and
   wherein the portion of the first operation result comprises:
      an operation result obtained based on first partial weights corresponding to the first model among the first connection weights, and a first partial vector corresponding to the first model in the first feature vector; and
      an operation result obtained based on second partial weights corresponding to the second model among the first connection weights, and a second partial vector corresponding to the second model in the first feature vector.

2. The recognition method of claim 1, wherein the determining of the feature vector further comprises using second connection weights of the second layer between a previous time and a current time, and a second feature vector output from the second layer at the previous time, to determine the feature vector output from the second layer.

3. The recognition method of claim 2, wherein the determining of the feature vector further comprises determining the feature vector by using a portion of a second operation result obtained based on the second connection weights and the second feature vector.

4. The recognition method of claim 3, wherein the portion of the second operation result comprises:
   an operation result obtained based on third partial weights corresponding to the first model among the second connection weights and a third partial vector corresponding to the first model in the second feature vector; and
   an operation result obtained based on fourth partial weights corresponding to the second model among the second connection weights and a fourth partial vector corresponding to the second model in the second feature vector.

5. The recognition method of claim 3, wherein the portion of the second operation result comprises a principal diagonal element of a matrix determined as the second operation result.

6. The recognition method of claim 1, wherein the first model and the second model are assigned to a same apparatus.

7. The recognition method of claim 1, wherein the first model and the second model are implemented in parallel.

8. The recognition method of claim 1, wherein the first model and the second model comprise a same number of layers, a same number of nodes and a same connection relationship between the layers.

9. The recognition method of claim 1, wherein the recognizing of the input data comprises recognizing the input data based on an n-th element corresponding to the first model and an n-th element corresponding to the second model in the feature vector.

10. The recognition method of claim 1, wherein the feature vector comprises a first partial feature vector corresponding to the first model and a second partial feature vector corresponding to the second model.

11. A non-transitory computer-readable storage medium storing instructions that, when executed by a processor, cause the processor to perform the method of claim 1.

12. A recognition apparatus comprising:
a processor; and
a memory comprising at least one instruction executable by the processor,
wherein the processor is configured to, in response to the at least one instruction being executed by the processor,
determine a feature vector corresponding to an ensemble model from input data, based on the ensemble model, and
recognize the input data based on the feature vector, and
wherein the ensemble model comprises a first model and a second model with a structure that is the same as a structure of the first model,
wherein the processor is further configured to input same input data among the input data to the first model and the second model,
wherein the processor is further configured to determine the feature vector output from the second layer based on a portion of a first operation result obtained based on first connection weights between a first layer and a second layer in the ensemble model, and a first feature vector output from the first layer based on the input data, and
wherein the portion of the first operation result comprises:
an operation result obtained based on first partial weights corresponding to the first model among the first connection weights, and a first partial vector corresponding to the first model in the first feature vector; and
an operation result obtained based on second partial weights corresponding to the second model among the first connection weights, and a second partial vector corresponding to the second model in the first feature vector.

13. The recognition apparatus of claim 12, wherein the processor is further configured to use second connection weights of the second layer between a previous time and a current time, and a second feature vector output from the second layer at the previous time, to determine the feature vector output from the second layer.

14. The recognition apparatus of claim 13, wherein the processor is further configured to determine the feature vector by further using a portion of a second operation result obtained based on the second connection weights and the second feature vector.

15. The recognition apparatus of claim 14, wherein the portion of the second operation result comprises a principal diagonal element of a matrix determined as the second operation result.

16. A method to recognize input data, comprising:
receiving the input data in an ensemble neural network comprising a first neural network and a second neural network implemented in parallel with the first neural network;
calculating, by a processor, in a first layer of the first neural network, a first partial feature vector;
calculating, by the processor, in a first layer of the second neural network, a second partial feature vector;
calculating, by the processor, a feature vector, by applying a weight matrix to the first partial feature vector and the second partial feature vector, wherein the weight matrix comprises connection weights between the first layer of the first neural network and a second layer of the first neural network, and connection weights between the first layer of the second neural network and a second layer of the second neural network; and
recognizing the input data based on the feature vector.

17. The method of claim 16, wherein the applying of the weight matrix to the first partial feature vector and the second partial feature vector comprises a multiplying a matrix comprising the first partial feature vector and the second partial feature vector by the weight matrix.

18. The method of claim 17, wherein the calculating of the feature vector further comprises applying an activation function to a result of the multiplying of the matrix comprising the first partial feature vector and the second partial feature vector by the weight matrix.

19. The method of claim 18, wherein the activation function comprises a term based on a third partial feature vector output from the second layer of the first neural network at a previous time, and a fourth partial feature vector output from the second layer of the second neural network at a previous time.

20. The method of claim 16, wherein the input data comprises one of an image, an audio signal, and a text.

* * * * *